Patented July 15, 1947

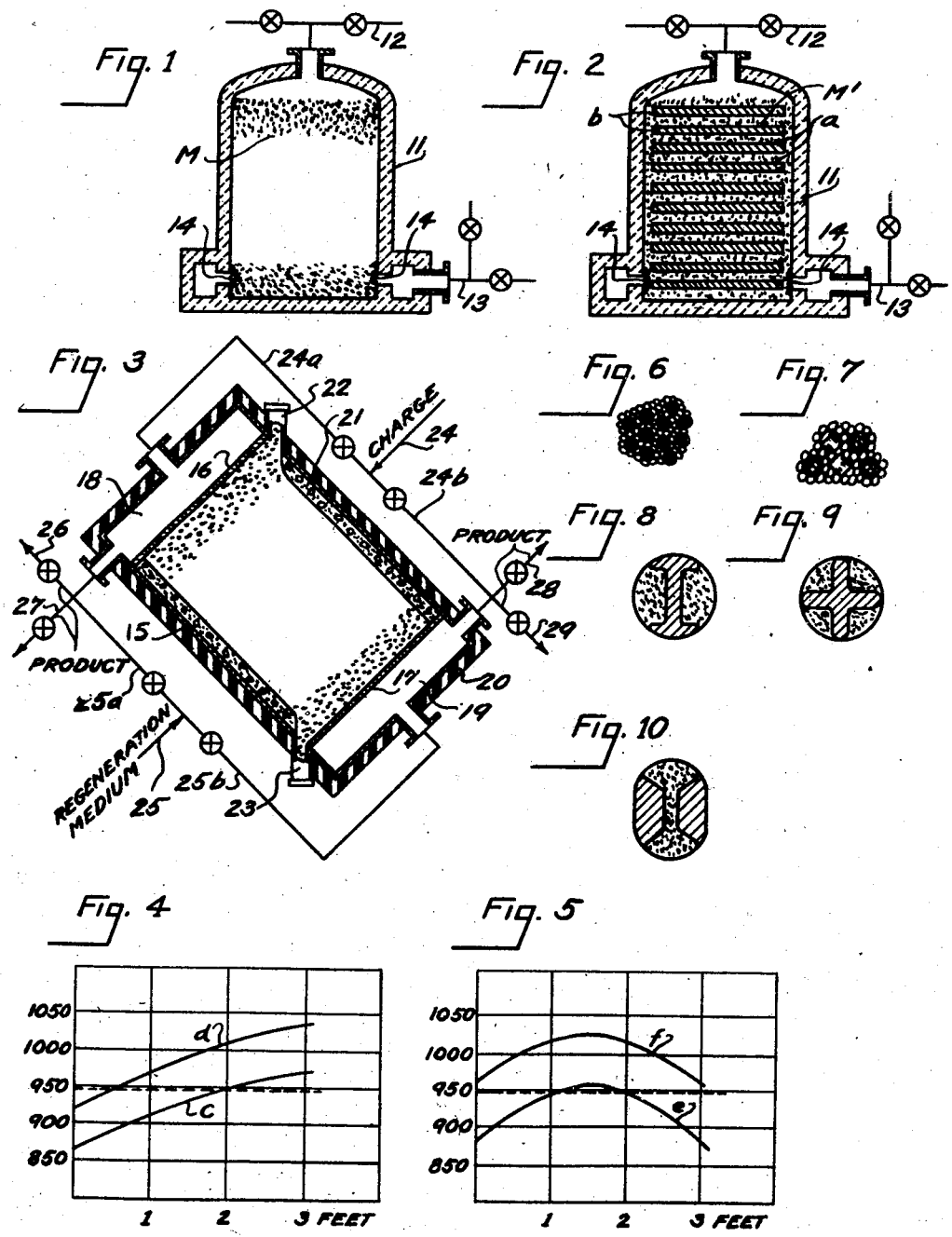
July 15, 1947.  E. J. HOUDRY  2,423,835
INERT HEAT MATERIAL IN CONTACT MASS CATALYSIS
Filed April 17, 1942  2 Sheets-Sheet 1
INVENTOR
EUGENE J. HOUDRY
BY
Ira L. Nickerson
ATTORNEY July 15, 1947. E. J. HOUDRY 2,423,835
INERT HEAT MATERIAL IN CONTACT MASS CATALYSIS
Filed April 17, 1942 2 Sheets-Sheet 2
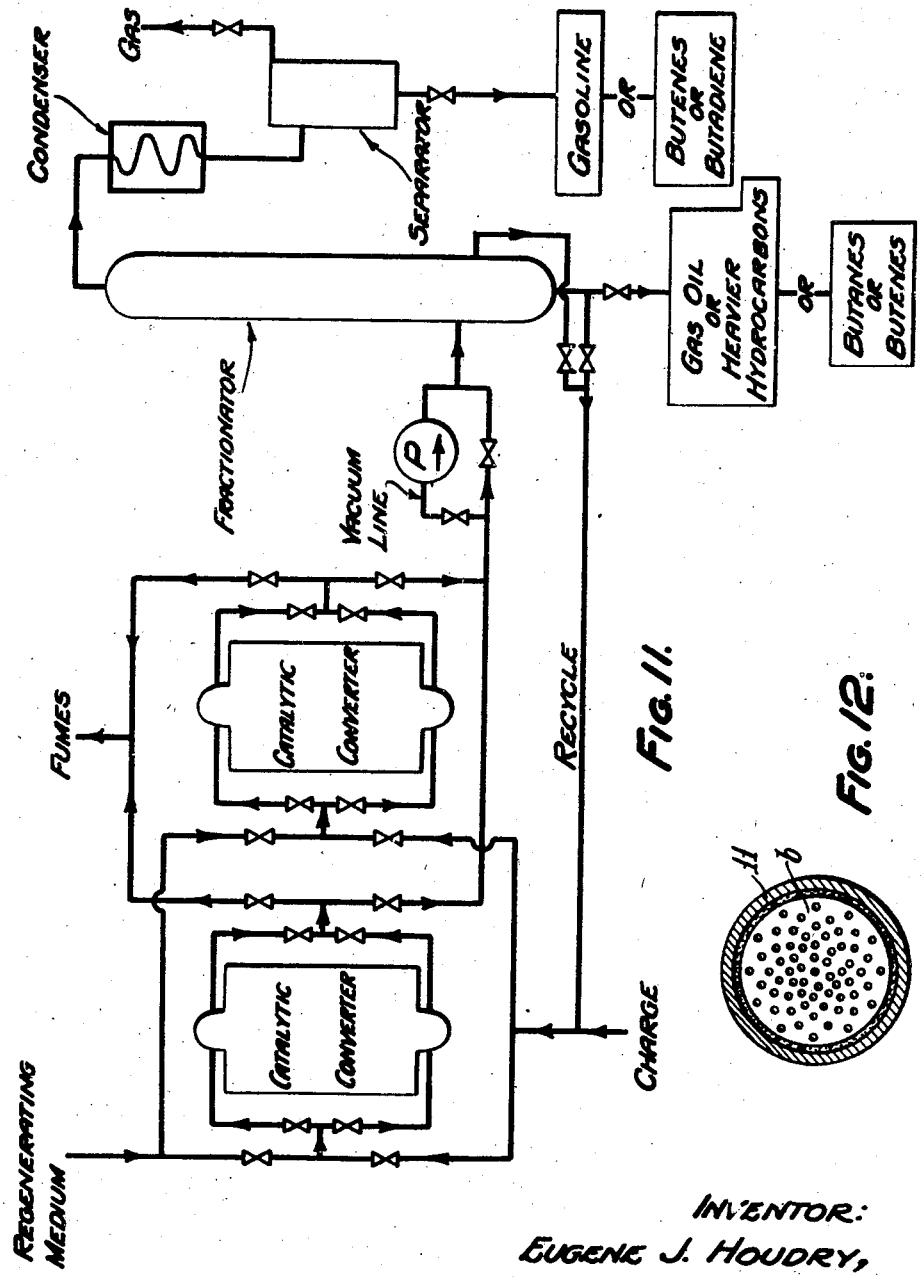
INVENTOR:
EUGENE J. HOUDRY,
BY Ira L. Nickerson
ATTORNEY.

2,423,835

UNITED STATES PATENT OFFICE 2,423,835

INERT HEAT MATERIAL IN CONTACT MASS CATALYSIS

Eugene J. Houdry, Ardmore, Pa., assignor to Houdry Process Corporation, Wilmington, Del., a corporation of Delaware Application April 17, 1942, Serial No. 439,338

5 Claims. (Cl. 260—680)

This invention relates to catalysis and to contact masses for promoting, controlling or in any manner assisting in the direction and extent of organic reactions.

One object is to simplify and to improve catalytic operations and apparatus. Another object is to provide novel forms of contact masses. Other objects will be apparent from the detailed description which follows.

The invention involves simplification and cheapening of apparatus for conducting catalytic operations on a commercial scale. It further provides for operating the same on an adiabatic basis by utilizing the apparatus for successive reactions which complement one another so that the contact mass is continuously maintained within a temperature range suitable for the reactions without requiring an extraneous heating or cooling fluid to be circulated through or around the reaction chamber. The contact mass is made up of active and inactive parts in uniform distribution within the contact or reaction chamber. An important characteristic of the mass is its high specific heat per volume of mass which enables the mass to absorb or to store up heat which can be subsequently released as desired or required.

In preparing to conduct a catalytic operation in a cycle of alternating on-stream and regenerating reactions without the aid of an extraneous fluid to remove heat or to supply heat, the first essential is to determine how the material to be charged to the operation cracks or dehydrogenates under a series of differing temperatures. With this information the desired mean temperature or operating range of temperatures for the on-stream reaction is selected. The contact mass is then selected, due consideration being given to the heat of reaction and to the quantity of coke deposit per volume of contact mass needed to produce the proper quantity of heat during regeneration. In general the ratio of active catalyst to inactive heat absorbing material will be in the range of 1:3 to 3:2, depending upon the specific heat and the weight of the inactive material as compared with the same characteristics of the active catalytic material. Any known or suitable catalysts may be utilized. For cracking operations silicious catalysts are suitable, such as blends or compounds of silica and alumina, of natural or artificial origin, with or without the inclusion of other active components such as metals or metallic compounds, etc. For dehydrogenation operations the usual dehydrogenating catalysts such as chromium, molybdenum, vanadium, iron, nickel, etc., may be utilized. The catalytic materials alone or on supports may be independent of the inactive material which stores heat or the active and inactive materials may be combined in units which make up the contact mass.

Among the commercial materials which are suitable for heat absorption are the following:

| | Density | Specific Heat | Heat capacity expressed as gram-calories per liter (solid) per deg. C. |
|---|---|---|---|
| Iron (metal) | 7.7 | 0.17 | 1,310 |
| Fused alumina (Trade names-Aloxite, Alundum) | 3.95 | 0.31 | 1,250 |
| Magnesite Brick | 3.5 | 0.31 | 1,070 |
| Dead Burned Magnesite Ore | 3.1 | 0.31 | 950 |
| Chrome brick | 3.95 | 0.29 | 1,140 |
| Silica brick | 2.35 | 0.32 | 760 |
| Fireclay brick | 2.6 | 0.26 | 680 |
| Ganister (Quartz) | 2.6 | 0.31 | 800 |

Additional materials of differing heat capacities are readily prepared, if needed, of which the following may serve as examples:

| | | Heat Treatment | Density | Specific Heat | Heat capacity expressed as gram-calories per liter (solid) per deg. C. |
|---|---|---|---|---|---|
| 1 | 40% Bentonite, 60% Kaolin | 1400 F. for 2 hrs | 1.7 | 0.26 | 440 |
| 2 | 20% Bentonite, 80% Kaolin | do | 1.64 | 0.26 | 425 |
| 3 | 10% Bentonite, 40% Kaolin, 50% iron | do | 2.33 | 0.21 | 490 |
| 4 | 10% Bentonite, 40% Kaolin, 50% Fe₃O₄ | do | 2.13 | 0.25 | 530 |

The heat capacities listed above are at 540° C. (1000° F.) and are the true measure of comparison between materials since they express the amount of heat stored in a unit volume of the material. In some instances the materials utilized for heat storage will not be entirely inert catalytically and will in some degree either improve or impair the reaction. It is also expedient at times to incorporate in the catalytic portion of the contact mass, or in the inert portion, or in both portions, a small quantity of metal or metallic compound, as of manganese, nickel, copper, cobalt, chromium, iron, etc., to serve as an oxidation promoter thereby to insure more rapid and complete burning of coky deposits during regenerating periods after the manner disclosed in my U. S. Patent No. 2,078,951, issued May 4, 1937.

By suitable control of operating conditions and of coke deposit I have found it to be entirely feasible to operate on a commercial scale and for extended periods in adiabatic cycle within a range of about 150° F. or less, at temperature above 700° F.; for example, refining and desulphurizing operations on petroleum distillates can be conducted in the range of 750° to 850° F., or with a mean temperature of about 800° F.; dehydrogenating and cracking operations to produce lighter hydrocarbons such as motor fuel, aviation fuel, etc., from heavier hydrocarbons can be effected in the range of 850 to 975° F. or with a mean temperature of about 925° F.; more drastic dehydrogenating or cracking operations, as to produce gases, especially of the unsaturated or olefinic type, can be conducted in the range of 975° to 1075° F. (mean temperature about 1025° F.) or even higher as in the range of 1075 to 1175° F. (mean temperature about 1125° F., etc.).

The accompanying drawings indicate typical forms of apparatus and methods of operation in accordance with the present invention. In the drawings Fig. 1 is a vertical sectional view of one type of converter;

Fig. 2 is a similar view showing a modified form of contact mass;

Fig. 3 is a somewhat diagrammatic view of another form of converter with provision for reversing the flow of reactants therethrough;

Figs. 4 and 5 are graphs with temperature curves illustrating a typical adiabatic operation under slightly different operating procedures.

Figs. 6 and 7 are perspective views of small quantities of suitable contact masses;

Figs. 8, 9 and 10 are vertical sectional views on an enlarged scale through individual pieces of modified forms of contact masses in which the catalytic material is combined with the inert or heat absorbing material.

Fig. 11 is a diagrammatic view illustrating installation of the process with provision for operating the catalytic converters either under pressure or under vacuum and with a further provision for the addition of recycle stock to the charge to the process; and Fig. 12 is a transverse sectional view through the center portion of Fig. 2 adjacent one of the plates of the heat exchange material.

In Fig. 1 a very simple and inexpensive form of converter is shown. Its walls 11 are constructed of fireclay, firebrick, high temperature cement, or the like for operations at atmospheric pressure. At its upper and lower portions it has valved connections 12 and 13 for the entrance and exit, respectively, of reactants and reaction products. These connections may be constructed, if desired, of non-metallic material of the same general type as converter walls 11, such as tile pipe and the like. The entire interior of the converter is the reaction chamber and is filled with the contact mass M, which may be in any of the forms shown in Figs. 6 to 10 inclusive. At the bottom of the converter an exit chamber surrounds, or partly surrounds, the base of the converter and is separated from the reaction chamber by grid 14. An alternative arrangement (not shown) is to support the contact mass on a grid above the bottom of the converter so as to leave an exit chamber immediately beneath the contact mass.

In Fig. 2 a converter similar in all respects to that shown in Fig. 1 is disclosed, but the contact mass M¹ is made up of layers of active catalytic material $a$ alternating with plates or discs $b$ of heat absorbing material. In filling the reaction chamber of this converter with the contact mass a layer of catalytic material $a$ of, say, ½" thickness is placed at the bottom of the reaction chamber followed by a plate or disc $b$ of inert material of slightly less than the transverse dimensions of the chamber and of about the same thickness as the layer of catalytic material if catalyst and heat absorbing material are to be in approximately 1:1 ratios. Alternate layers of catalyst $a$ and heat absorbing plates $b$ are laid in the chamber until the same is full. For vertical movement of the reactants through the mass the discs or plates $b$ of heat absorbing material are preferably perforated as indicated in Fig. 12 to permit convenient access of reactants to all parts of the catalyst layers $a$. When the flow of reactants is arranged to be in a horizontal direction or axially of plates $b$, perforations in the plates can be omitted.

Fig. 3 illustrates a different form of converter adapted for sub- or superatmospheric pressure of any desired degree and also shows an arrangement for sending reactants through the converter in either direction. The converter comprises a cylindrical metal casing 15, closed at both ends, the interior being provided adjacent its opposite ends with apertured transverse partitions 16 and 17, which divide the converter into a central reaction chamber to receive the contact mass and end manifolding chambers 18 and 19. The entire exterior of the converter is enclosed by a layer of heat insulating material 20 and the side walls of the reaction chamber are lined with a layer 21 of fireclay, firebrick or high temperature cement. At diagonally opposite points the wall of the converter is apertured and over these apertures are mounted capped spouts 22 and 23 for filling and emptying the reaction chamber with the contact mass. The converter is mounted in an inclined position, approximately 45° to the vertical, to disclose inlet spout 22 and outlet spout 23 at the highest and lowest points respectively of the reaction chamber, after the manner disclosed in my copending application Serial No. 437,687, filed April 4, 1942, and issued April 15, 1947, as Patent No. 2,418,838. Any of the forms of contact mass disclosed in Figs. 6 to 10 may be utilized for this converter. It is also possible to conveniently mount in the converter of Fig. 3 contact masses of the type described in connection with Fig. 2, namely, catalytic material in layers alternating with heat absorbing material in the form of plates, grids and the like. The method of mounting such heat absorbing plates or grids in a converter such as shown in Fig. 3, while permitting convenient insertion and removal of the catalytic part of the contact mass, is disclosed and claimed in my aforesaid copending application in connection with Figs. 4–10 thereof.

The charge to the converter of Fig. 3 is sent to the same by line 24, which has valved branches 24$a$ and 24$b$ communicating with end manifolding chambers 18 and 19, respectively. Similarly, a regenerating medium such as air or an oxygen-containing gas, can be fed to the converter by line 25, which has valved branches 25$a$ and 25$b$ extending to manifolding chambers 18 and 19, respectively. The reaction products can be withdrawn from manifolding chamber 18 by either of valved lines 26 or 27. From the opposite manifolding chamber 19 products can be withdrawn either by valved line 28 or valved line 29. Purging of the converter from either end, either by vacuum or by purging medium, may be effected by suitable connections (not shown) to the product lines. The converters shown in Figs. 1 and 2 can be connected up for reversal of flow of reactants in a similar manner.

Figs. 4 and 5 indicate by graphs typical operations in accordance with the invention aimed at a mean temperature of approximately 945° F. with a contact mass three feet in depth. The temperature scale is on the abscissa and the catalyst depth on the ordinate.

Fig. 4 indicates the temperatures obtaining when the reactants for both the on-stream and the regenerating periods enter always from the same end of the converter, the curve c showing the temperatures at the close of the on-stream period and the curve d the temperatures at the end of the regenerating period. Fig. 5 shows the same operation but indicates the effect on temperatures when the direction of flow of reactants is reversed at the end of each regenerating period, i. e. the on-stream and regenerating reactants are sent through the converter in the same direction for one cycle and then the direction of movement of reactants is changed to the opposite direction for the next cycle and so on, the direction of movement being reversed after each regenerating period. The curve e indicates the temperatures at the end of an on-stream period and curve f the temperatures at the end of a regenerating period. This mode of procedure has the effect of rounding off the temperature curves and of bringing a greater quantity of the reaction chamber or contact mass into the zone of best operation which usually extends about 20° to 30° F. on either side of the desired mean or average temperature. The mean temperature of 945° F. is indicated on both graphs by the broken line.

Various forms of contact masses are indicated in the remaining figures of the drawing. Fig. 6 shows the contact mass made up of a mixture of separate pieces of catalytic material and inert material, the catalytic material being indicated by circles and the inert material in solid black. The materials may be made up in pieces of the same size or of different sizes but for convenience in distinguishing the same and for separation whenever the catalytic material needs to be renewed by reason of loss of activity or to be changed to promote a different reaction, the catalytic pieces may for example be of approximately half the size of the pieces of inert material, as for example, 2 mm. pieces of catalyst and 4 mm. pieces of inert material. Fig. 6 shows the inert material in pieces of larger size than the active material. In Fig. 7 there is a similar mixture of inert and catalytic material, but in this instance the inert material takes the form of Raschig rings of metal or porcelain material in and around which the catalytic material is distributed in substantially uniform manner and in the proper ratio for control of the reaction. With this arrangement separation of inert from catalytic material is also easy due to difference in size and shape of the two components of the contact mass.

Figs. 8, 9 and 10 show in section typical forms of contact masses in which the catalytic and inert materials are combined in the individual units making up the mass, the inert portions being indicated by full section lines and the catalytic material in dotted sections. In Fig. 8 the centran section through the mass with flattened or rounded ends forms the inert portion of the mass upon which the catalytic material has been molded in the form of an annulus. Fig. 10 shows somewhat the reverse of Fig. 8 in which the inert material forms an annulus and the catalytic material makes up the central core with rounded end portions. In Fig. 9 the inert material is in the general form of "jacks" used in a child's game, over and around which the catalytic material has been molded. When composite contact units of the forms shown in Figs. 8, 9 and 10 are used and when the inert material is metal, it will be apparent that parts of the metal or inert portion of each of the units will be in contact so that there will be heat conduction throughout the entire contact mass with a tendency to distribute the heat uniformly throughout the reaction chamber and to approach a constant temperature throughout the chamber.

A number of examples to illustrate the scope and importance of the invention are given below:

*Example 1*

Operation: Cracking of heavy hydrocarbons to produce aviation gasoline.

Charge: 56 to 88% cut of East Texas crude having an A. P. I. gravity of 28.1 and distillation characteristics of initial boiling point 336° F., 5% vaporized at 554° F., 10% vaporized at 610° F., and 98.5% vaporized at 1025° F.

Contact mass:
  Active: Clay catalyst of moderate activity.
  Inert: Prepared ceramic—apparent density 1—made of bentonite and kaolin as (1) or (2) above.
  Ratio: Active to inert—6:11.

On-stream conditions:
  Contact mass at start—average_____°F__ 903
  Contact mass at end—average_____°F__ 840
  Mean temperature_____°F__ 871
  Pressure _____ Atmospheric
  Charging rate liters liquid per hour per liter active catalyst _____ (Total 24) 8 fresh charge, 16 recycle (350-620° F. boiling range)
  Steam, % by weight of charge_____ 50
  Time on stream_____minutes__ 16
  Inlet temperature of charge_____°F__ 825

Regenerating conditions:
  Time of regeneration including purging periods _____minutes__ 16
  Pressure _____ Atmospheric
  Inlet temperature of regenerating medium _____°F__ 810

Products:
  Gas, 15.5% by weight of charge_____specific gravity__ 1.13
  Coke, 5.4% by weight of charge _____ 5.6 grams per liter of catalyst
  Liquid recovery: 87.8% by volume.
  Condensed aviation gasoline: 43.8% by volume.

The recycle material disappeared in the operation so that there was nothing left between the aviation cut and the bottoms which had a boiling range of 550–800° F.

Example 2

Operation: Cracking of heavy hydrocarbons.
Charge: First pass cycle stock (A. P. I. gravity 30.6) from 56–88% cut of East Texas crude.
Contact mass:
    Active: clay catalyst of moderate activity.
    Inert: No. 8 steel shot—calorized.
    Ratio by volume: active to inert—1:1.
On-stream conditions:
    Contact mass at start—average____°F__ 970
    Contact mass at end—average_____°F__ 905
    Mean temperature_____°F__ 937
    Pressure _____ Atmospheric
    Charging rate, liters liquid per hour per liter active catalyst_____ 30
    Steam, % by weight of charge_____ 50
    Time on stream_____minutes__ 16
    Inlet temperature of charge_____°F__ 800
Regenerating conditions:
    Time of regeneration including purging periods _____minutes__ 16
    Pressure _____ Atmospheric
    Inlet temperature of regenerating medium _____°F__ 800
The products:     Per cent weight of charge
    $CO_2$ _____ .17
    CO, $H_2$, methane_____ .64
    Ethane _____ .59
    Propane _____ 2.18
    Isobutane _____ .79
    N-butane _____ .08
    Iso-butene _____ 1.25
    N-butene _____ 2.01
    Gasoline ($C_5+$)_____ [1] 29.49
    Bottoms _____ [2] 60.40
    Coke _____ 2.40
                                  100.00

[1] A. P. I. gravity 52.
[2] A. P. I. gravity 25.3.

Example 3

Operation: Cracking of naphtha to produce aviation gasoline and toluene.
Charge: Naphtha in boiling range of 300–410° F. with octanes of 35.2 (C. F. R. motor method) and 31.2 (C. F. R. research method).
Contact mass:
    Active: highly active synthetic silica-alumina or silica-zirconia.
    Inert: steel shot or plates—calorized or chrome plated.
    Ratio: active to inert 10:7.
On-stream conditions:
    Contact mass at start—average____°F__ 977
    Contact mass at end—average_____°F__ 917
    Mean temperature_____°F__ 945
    Pressure, lbs. per sq. in. gage____(See below)
    Charging rate, liters of charge (liquid) per liter of total mass per hour _____ (See below)
    Time on stream_____minutes__ 16
    Inlet temperature of charge_____°F__ 820
Regenerating conditions:
    Time of regeneration including purging periods _____minutes__ 16
    Pressure _____ Atmospheric
    Inlet temperature of regenerating medium _____°F__ 770

Table

| Recycle Ratio | 0 | 1 | 2 |
|---|---|---|---|
| Charge Rates: | | | |
|   Fresh Feed—Liters per hr. per liter of mass | 20 | 11 | 7 |
|   Recycle Rate—Liters per hr. per liter of mass | 0 | 11 | 14 |
|   Total Case rate—Liters per hr. per liter of mass | 20 | 22 | 21 |
| Steam, per cent wt. Fresh Feed | 0 | 0 | 15 |
| Steam, per cent wt. case charge | 0 | 0 | 5 |
| On Stream pressures, lbs. per sq. in. | 12 | 5 | 5 |
| Yields (Fresh Feed Basis): | | | |
|   Coke— | | | |
|     Per cent wt. | 2.0 | 4.4 | 6.7 |
|     Grams per liter | 4.2 | 5.3 | 5.1 |
|   Debut. Avia. Base—275° F. at 90% evap.: | | | |
|     Per cent vol. | 26.9 | 29.4 | 41.7 |
|     Per cent wt. | 24.2 | 27.6 | 39.7 |
|   Synthetic Tower Bottoms: | | | |
|     Per cent vol. | 56.3 | 33.4 | 7.9 |
|     Per cent wt. | 58.2 | 34.3 | 8.2 |
|   Gas—Total $C_4$ and Lighter | 11.7 | 33.6 | 45.0 |
|     Isobutane: | | | |
|       Per cent vol. | | 11.4 | 13.5 |
|       Per cent wt. | | 8.2 | 9.6 |
|     Isobutene: | | | |
|       Per cent vol. | | 3.0 | 4.0 |
|       Per cent wt. | | 2.3 | 3.0 |
|     n-Butene: | | | |
|       Per cent vol. | | 4.6 | 6.8 |
|       Per cent wt. | | 3.6 | 5.2 |
| Toluene Content (Initial—300° Cut), vol. per cent cut | | | 9.62 |
| Product Inspections: | | | |
|   Debut. Gasoline— | | | |
|     A. P. I. | 59.5 | 55.4 | 53.5 |
|     Initial B. P. | 108 | 110 | 106 |
|     10% | 134 | 138 | 132 |
|     50% | 194 | 202 | 216 |
|     90% | 274 | 282 | 282 |
|     R. V. P., #/sq. in. | 7.7 | 7.4 | |
|     A. S. T. M., Motor Octane | 79.9 | 82.8 | 83.0 |
|     C. F. R. Research | 88.9 | 92.9 | 91.0 |
|     AFD-1-C Octane Clear | | 81.1 | |
|     AFD-1-C Octane+3 cc. T. E. L. | 90.5 | 91.0 | 92.0 |
|     AFD-1-C Octane+4 cc. T. E. L. | 92.6 | 93.1 | 94.0 |
|     Francis Bromine No. | 21.0 | 31.6 | 34.7 |
|     Acid Heat (Calc.) | 52.0 | 68.0 | 75.0 |
|   Synthetic Tower Bottoms: | | | |
|     A. P. I. | | | 42.7 |
|     Initial B. P. | | 306 | 298 |
|     10% | | 320 | 314 |
|     50% | | 342 | 332 |
|     90% | | 394 | 330 |
|     E. P. | | 508 | 578 |

Particularly noteworthy is the 2:1 recycle operation of this example for the toluene content (almost 10% by volume) of the aviation product. Accordingly, such an operation is important as a source of production of toluene as well as of other valuable hydrocarbons.

Example 4

Operation: Production of butene from butane.
Contact mass:
    Active: 4% $Cr_2O_3$ on activated alumina.
    Inert: Prepared material—bentonite and kaolin—as in Example 1.
    Ratio: Active to inert 1:2.5.
On-stream conditions:
    Temperature:
      Contact mass at start— average _____°F__ 1090
      Contact mass at end— average _____°F__ 1020
      Mean temperature _____°F__ 1055
    Vacuum, inches of mercury _____ 20
    Rate: liters of gas at 70° F. per minute per liter of active material _____ 4.75
    Contact time on total mass in seconds __ 5.35
    Time on stream _____minutes__ 20
    Inlet temperature of gas _____°F__ 850
Regenerating conditions:
    Time of regeneration in minutes including purging periods _____minutes__ 20
    Pressure _____ Atmospheric
    Inlet temperature of regenerating medium _____°F__ 1000

Podbielniak analysis of charge and products is as follows:

| Material | N-Butane Charge, On Charge | | Cracked Gas | | | |
|---|---|---|---|---|---|---|
| | Mol. Per cent | Wt. Per cent | On Cracked Gas | | On Chg., Wt. Per cent | On C₄'s in Cracked Gas, Wt. Per cent |
| | | | Mol. Per cent | Wt. Per cent | | |
| CO₂ | | | 0.0 | 0.0 | 0.0 | |
| CO | | | 1.5 | 1.1 | 1.1 | |
| H₂ | | | 28.2 | 1.5 | 1.5 | |
| Methane | | | 5.5 | 2.3 | 2.3 | |
| Ethane | | | 1.2 | 0.9 | 0.9 | |
| Propane | | | 1.4 | 1.6 | 1.6 | |
| Isobutane | 3.9 | 3.9 | 1.4 | 2.1 | 2.1 | 2.3 |
| N-butane | 90.6 | 90.4 | 32.6 | 49.4 | 48.8 | 53.3 |
| Isobutene | 1.4 | 1.3 | 2.0 | 2.9 | 2.9 | 3.2 |
| N-butene | 2.3 | 2.2 | 21.8 | 32.0 | 31.7 | 34.6 |
| Butadiene | | | 4.4 | 6.2 | 6.1 | 6.6 |
| C₅+ | 1.8 | 2.2 | | | | |
| Total | 100.0 | 100.0 | 100.0 | 100.0 | 99.0 | 100.0 |
| Calculated Gas Gr. | 2.01 | | | 1.326 | | |
| Per cent Unsaturates | 5.0 | | | 28.3 | | |

Example 5

Operation: Production of butadiene from butene-2.

Contact mass:
  Active: 22.8% $Cr_2O_3$ on cellite.
  Inert: Prepared material—bentonite and kaolin—as in Example 1.
  Ratio: Active to inert—1:2.

On-stream conditions:

Contact mass at start—average °F__ 1190
  Contact mass at end—average °F__ 1165
  Mean temperature °F__ 1178
  Vacuum, inches of mercury __ 20
  Rate, liters of gas at 70% F. per minute per liter of active catalyst __ 15.5
  Contact time on total mass seconds __ 1.3
  Time on stream minutes __ 5
  Inlet temperature of gas °F__ 900

Regenerating conditions:

Time of regeneration including purging periods minutes__ 10
  Pressure __ Atmospheric
  Inlet temperature of regenerating medium °F__ 850

Podbielniak analysis of charge and products is as follows:

| Material | Butene-2 Chg., On Charge | | Cracked Gas | | | |
|---|---|---|---|---|---|---|
| | Mol., Per cent | Wt., Per cent | On Cracked Gas | | On Charge, Wt. Per cent | On C₄'s in Cracked Gas, Wt. Per cent |
| | | | Mol., Per cent | Wt., Per cent | | |
| CO₂ | 0.0 | 0.0 | 1.0 | 0.9 | 0.9 | |
| CO | | | 0.9 | 0.5 | 0.5 | |
| H₂ | 0.8 | 0.1 | 13.9 | 0.6 | 0.6 | |
| Methane | | | 1.3 | 0.4 | 0.4 | |
| Ethane | 0.0 | 0.0 | 0.1 | 0.1 | 0.1 | |
| Propane | 1.9 | 1.5 | 1.2 | 1.1 | 1.1 | |
| Isobutane | 0.0 | 0.0 | 0.2 | 0.2 | 0.2 | 0.2 |
| N-butane | 7.6 | 7.9 | 5.8 | 7.1 | 7.0 | 7.5 |
| Isobutene | 5.4 | 5.4 | 5.5 | 6.5 | 6.4 | 6.8 |
| N-butene | 83.0 | 83.5 | 56.0 | 66.2 | 65.2 | 69.8 |
| Butadiene | | | 13.1 | 14.9 | 14.7 | 15.7 |
| C₅+ | 1.3 | 1.6 | 1.0 | 1.5 | 1.5 | |
| Total | 100.0 | 100.0 | 100.0 | 100.0 | 98.6 | 100.0 |
| Calculated Gas Gravity | 1.94 | | | 1.65 | | |

For continuous operation of the process two converters are needed when the on-stream and regenerating periods are of the same length as in Examples 1 to 4 and three converters are needed when the regenerating period is twice as long as the on-stream period as in Example 5. Once the operating conditions have been established and the converter brought to temperature with adequate heat storage capacity in the inert portion of the contact mass, the temperature swing of the mass in the cycles of on-stream and regenerating reactions becomes uniform and regular. Any variations are slight, merely a degree or two per cycle, so that any necessary adjustment will be infrequent and easily made in any one of a number of directions, as on entering temperatures of the reactants, on feed rate or rates, composition of reactants, etc. When production of aromatics and unsaturates is desired it is often preferable to send both the on-stream and the regenerating reactants into the converter at all times from the same end so as to have a rising temperature gradient, as in Fig. 4, as the on-stream reactants traverse the contact mass.

Metals, such as iron and steel, present a high degree of heat capacity per volume of space occupied. The use of such metals evenly distributed through the catalyst, as in the form of parallel plates or shot or in units such as shown in Figs. 8 to 10, gives good temperature control for adiabatic operations. However, the presence of iron oxide is detrimental to many reactions. Hence it is desirable to use alloys resistant to oxidation or to protect the surfaces of such metals from oxidation as by calorizing, chrome plating, enameling, etc.

In adiabatic operations in accordance with the present invention the on-stream periods are normally less than thirty minutes and the reactions are conducted so as to produce coke deposits not in excess of 15 grams per liter of active component of the contact mass. Usually the coke deposit is considerably lower as between 4 and 10 grams per liter. In dehydrogenating operations, as in Example 5, it is important for best results to operate with clean catalyst so as to maintain a straight dehydrogenating reaction. Accordingly the operating periods are short and the coke lay down low, as of the order of 1% by weight of the charge, necessitating heat to be supplied during the regenerating period by high temperature air, flue gas, etc.

Certain aspects of the invention disclosed herein comprise subject matter of my copending application Serial No. 561,552, filed November 2, 1944 as a continuation-in-part hereof.

I claim as my invention:

1. Process of effecting contacting operations for processing hydrocarbons in a reaction chamber containing a contact mass subjected to alternating on-stream and regenerating reactions, the contact mass comprising catalyic material and substantially inert heat absorbing material in the ratio of at least 1:3, limiting the on-stream periods to less than thirty minutes, and adjusting the operating conditions to maintain the contact mass at a predetermined mean temperature in excess of about 850° F. during on-stream operations in a continuing cycle by the heat liberated and absorbed by said mass during the alternating regenerating periods, both the on-stream and the regenerating reactants being fed to and through the reaction chamber in the same direction and reversing the direction of feed after each regeneration.

2. Process of effecting contacting operations on hydrocarbons in a reaction chamber containing a contact mass subjected to alternating on-stream and regenerating reactions, the contact mass comprising catalytic material and substantially inert heat absorbing material in the ratio of at least 1:3, limiting the on-stream periods to less than thirty minutes, and adjusting the operating conditions to maintain the contact mass at a predetermined mean temperature in excess of about 850° F. during on-stream operations in a continuing cycle by the heat liberated and absorbed by said mass during the alternating regenerating periods, both the on-stream and the regenerating reactants being fed to said reaction chamber at temperatures below said predetermined means temperature and in the same direction but with reversal of direction after each regeneration.

3. Process of effecting contacting operations on hydrocarbons in an adiabatic cycle of alternating on-stream and regenerating reactions by absorbing the heat of the regenerating reactions in a contact mass comprising heat absorbing material interspersed with catalytic material for promoting the on-stream reactions, the heat absorbing material being in sufficient quantity and of sufficient heat capacity to hold substantially the entire mass during on-stream reactions within 50° F. above and below a predetermined means temperature, controlling the on-stream operating conditions to confine the coky deposit on the contact mass to less than 15 grams per liter of catalytic material, and reversing the direction of movement of the reactants through the contact mass at the end of a cycle of on-stream and regenerating reactions.

4. Process of dehydrogenating gaseous hydrocarbons to produce unsaturates which comprises subjecting the gaseous charge to the action of a contact mass made up of active dehydrogenating catalytic material and inert heat absorbing material, said materials being uniformly associated together in the ratio of 1:3 to 3:2, operating said mass alternately on stream and in regeneration by oxidation in an adiabatic cycle, effecting the on-stream operation under substantial vacuum and controlling operating conditions to effect dehydrogenation at a mean temperature of said contact mass of at least 1000° F., both the on-stream and the regenerating reactants being fed to and through the contact mass in the same direction but with reversal of the direction of feed after each regeneration.

5. Process of converting butene into butadiene which comprises subjecting the butene charge to the action of a contact mass made up of active dehydrogenating catalytic material and inert heat absorbing material, said materials being uniformly associated together in the ratio of 1:3 to 3:2, operating said mass alternately on stream and in regeneration by oxidation in an adiabatic cycle with reversal of direction of feed of reactants after each regeneration, maintaining said mass under partial vacuum during on-stream operations and controlling operating conditions to effect the conversion at a mean temperature of said contact mass of at least 1150° F.

EUGENE J. HOUDRY.

REFERENCES CITED

The following references are of record in the file of this patent:

UNITED STATES PATENTS

| Number | Name | Date |
|---|---|---|
| 1,697,262 | Ellis | Jan. 1, 1929 |
| 1,853,771 | Larson | Apr. 12, 1932 |
| 2,042,306 | Haslam | May 26, 1936 |
| 2,161,676 | Houdry | June 6, 1939 |
| 2,178,584 | Grosse | Nov. 7, 1939 |
| 2,244,612 | Crowley, Jr. | June 3, 1941 |
| 2,290,845 | Voorhees | July 21, 1942 |
| 2,312,006 | Thiele | Sept. 13, 1939 |
| 2,001,907 | Ipatieff | May 21, 1935 |
| 2,161,677 | Houdry | June 6, 1939 |
| 2,339,894 | Voorhees | Jan. 25, 1944 |
| 2,347,216 | Peterkin | Apr. 25, 1944 |
| 2,301,044 | Heard et al. | Nov. 3, 1942 |
| 2,304,183 | Layng et al. | Dec. 8, 1942 |
| 2,212,035 | Morrell et al. | Aug. 20, 1940 |
| 2,289,716 | Marschner | July 14, 1942 |
| 2,382,239 | Lee | Aug. 14, 1945 |

FOREIGN PATENTS

| Number | Country | Date |
|---|---|---|
| 463,244 | Great Britain | Nov. 29, 1935 |